United States Patent [19]

Keys

[11] Patent Number: 5,932,153
[45] Date of Patent: Aug. 3, 1999

[54] TIRE TREAD

[75] Inventor: James F. Keys, St. Neots, United Kingdom

[73] Assignee: The Standard Products Company, Cleveland, Ohio

[21] Appl. No.: 08/805,425

[22] Filed: Feb. 25, 1997

Related U.S. Application Data

[62] Division of application No. 08/591,274, Jan. 25, 1996, Pat. No. 5,769,975.

[51] Int. Cl.⁶ .................................................... B29C 35/02
[52] U.S. Cl. .......................... 264/36.14; 156/96; 264/326; 425/17; 425/28.1
[58] Field of Search ................................. 264/36.14, 219, 264/315, 326, 236; 156/96; 425/28.1, 17, 40

[56] References Cited

U.S. PATENT DOCUMENTS

| | | |
|---|---|---|
| 1,426,672 | 8/1922 | Radford . |
| 1,482,325 | 1/1924 | Shively . |
| 1,928,404 | 9/1933 | Woock et al. ........................ 264/36.14 |
| 2,142,971 | 1/1939 | Bierer . |
| 2,907,365 | 10/1959 | MacDonald . |
| 3,815,651 | 6/1974 | Neal . |
| 3,901,632 | 8/1975 | Prosdocimi . |
| 4,176,702 | 12/1979 | Seiberling . |
| 4,624,732 | 11/1986 | King . |
| 4,680,071 | 7/1987 | Candle . |
| 4,869,759 | 9/1989 | King et al. . |
| 4,909,873 | 3/1990 | Detwiler . |
| 5,055,148 | 10/1991 | Lindsay et al. ........................ 264/36.14 |
| 5,256,361 | 10/1993 | Keys . |
| 5,277,727 | 1/1994 | Seiler et al. . |
| 5,709,830 | 1/1998 | Triantafyllis ............................ 264/219 |

FOREIGN PATENT DOCUMENTS

| | | |
|---|---|---|
| 0 464 660 A1 | 1/1992 | European Pat. Off. . |
| 1 210 348 | 2/1966 | Germany . |
| 27 08 013 | 2/1977 | Germany . |
| 60-234004 | 4/1986 | Japan . |
| 2-253904 | 12/1990 | Japan . |

*Primary Examiner*—Mathieu D. Vargot
*Attorney, Agent, or Firm*—Harness, Dickey & Pierce, P.L.C.

[57] ABSTRACT

A tire tread that is applicable to retread a worn tire carcass. The tire tread includes a cured tread portion having a first shoulder and a second shoulder. A first uncured wing portion extends from the first shoulder and a second uncured wing portion extends from the second shoulder. Further, an end section at each end of the tire tread portion is uncured. When the tire tread is wrapped around the tire carcass to be formed to the tire carcass and form a tire retread, the first and second wing portions extend down the side walls of the tire carcass and the uncured end sections of the tire tread contact each other. The tire carcass is placed within an autoclave, and the autoclave is heated under pressure such that the tire tread is cross-linked to the tire carcass. During the autoclaving step, the uncured wing portions are cured and cross-linked to the side walls of the tire carcass, and the uncured end portions are cured and cross-linked to each other. A mold segment is positioned within the tire tread pattern where the end sections of the tire tread meet in order to prevent the tire tread pattern from being damaged at the uncured end sections during the autoclaving process.

6 Claims, 3 Drawing Sheets

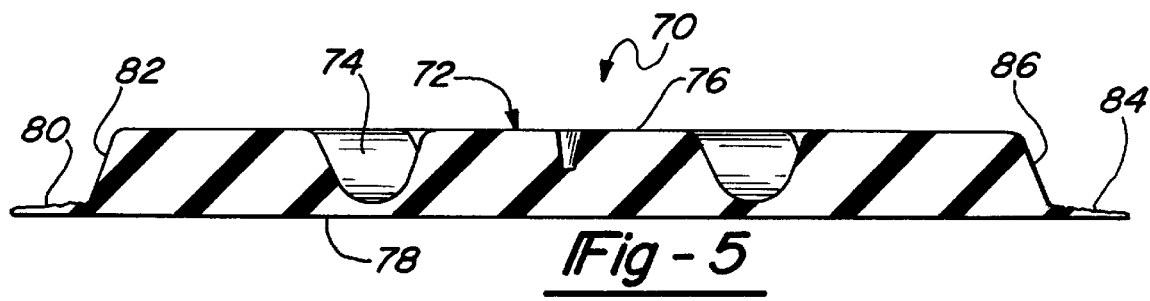
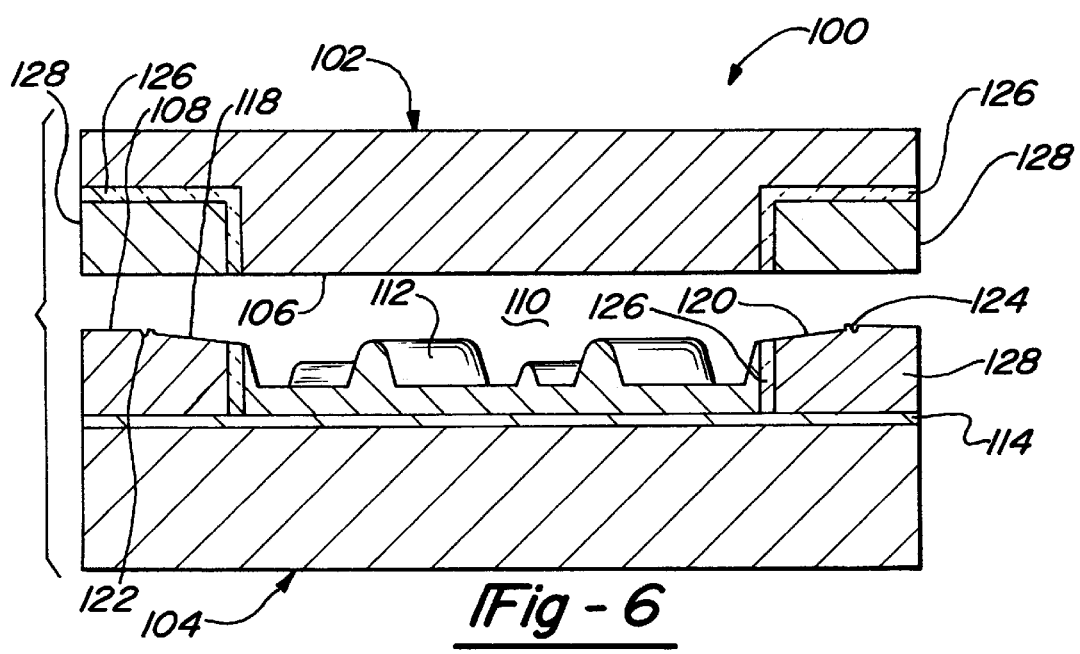
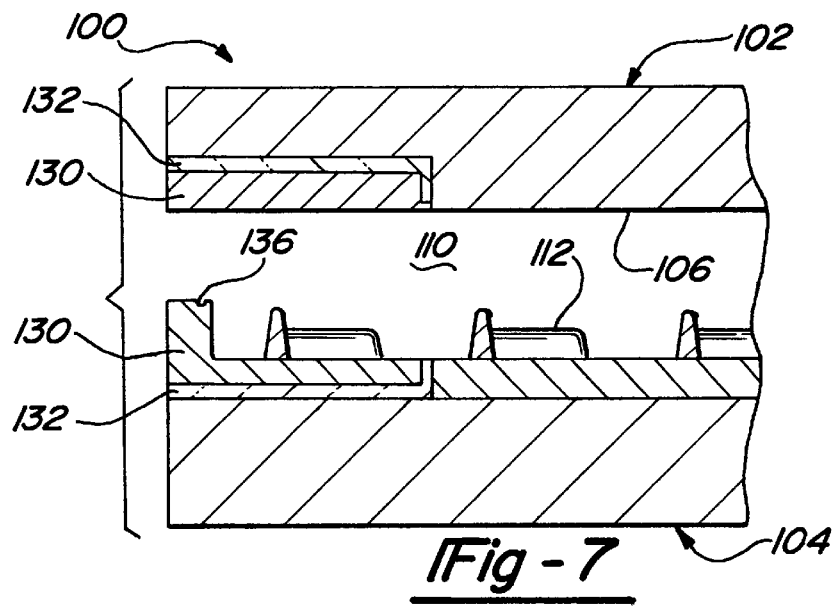

TIRE TREAD

This is a divisional of U.S. patent application Ser. No. 08/591,274, filed Jan. 25, 1996, now U.S. Pat. No. 5,769,975.

BACKGROUND OF THE INVENTION

1. Field of the Invention

This invention relates generally to an improved tire tread applicable for retreading a worn tire carcass and, more particularly, to an improved tire tread for retreading a worn tire carcass that includes uncured wing portions that are cross-linked to the side walls of the tire carcass so as to provide a smooth transition between the tire side walls and the tread.

2. Discussion of the Related Art

As is well understood in the art, it is highly desirable to apply a new tire tread to worn rubber tires for all types of vehicles using such tires. When the original tread of a rubber tire has been worn from use and/or has deteriorated from exposure to environmental conditions to such a degree that the tire has significantly reduced traction capabilities, and thus is no longer safe for continued use, the used tire carcass can be conditioned to accept a new tire tread so as to revitalize the old tire to make the original tire safe to be used again. By retreading used tire carcasses, the tire carcass need not be discarded and as such environmental concerns directed to the disposal of old tires can be positively addressed. Further, less rubber resources are necessary to generate a piece of tire tread, as opposed to a whole new tire. Also, providing a retreaded tire is less costly than a new tire.

Two types of retread processes are the most common in the art. A first type of retread process is referred to as a mold cure process. In the mold cure retread process, the remaining tread of a worn tire carcass is ground off so as to generate a suitable roughened surface to accept a new tire tread. The tire carcass is then placed in a tire mold that is similar to the tire mold that would have been used to mold the original tire. Uncured tread rubber is then placed into the mold, and the mold is pressurized and heated such that the tread rubber is vulcanized or cured into a tread pattern and cross-linked to the tire carcass. Once the mold is cooled, a retreaded tire is produced that resembles the original tire.

The mold cure process is a successful tire retreading process. However, the mold cure retread process requires tire molds that are expensive. Because of this sizable investment, it has been known in the art to retread worn tire carcasses by what is referred to as a precure retreading process. U.S. Pat. No. 4,624,732 issued to King, herein incorporated by reference, discloses a known precure retreading process. As with the mold cure process, the remaining tread and side walls of a worn tire carcass are ground down to form a roughened surface applicable to accept a new tread and side walls. A premolded and precured tire tread is then provided that will be adhered to the prepared tire carcass. An uncured rubber bonding layer is applied to the tire carcass, and the precured tire tread is then wrapped around the tire carcass over the bonding layer. The tire carcass and precure tread are secured together within an envelope to form a retread tire assembly. The retread tire assembly is then placed in an oven or autoclave, and is heated under pressure such that the bonding compound layer is cured so as to cause a cross-linked bond between the tread and the tire carcass. As is apparent by studying the precure process, entire tire molds are not necessary in that the tire tread is already molded and cured prior to being applied to the tire carcass.

An extension to the precure retread process discussed above includes providing new side walls to a tire carcass that also have been deteriorated by wear. U.S. Pat. No. 4,869,759, issued to King et al and herein incorporated by reference, discloses a method and apparatus for replacing a side wall of a worn tire carcass that can be used in conjunction with the precure retreading process discussed above. The side wall replacement process includes inserting uncured rubber panels within the envelope that conform to the shape of the tire carcass side wall. Once the tire assembly is placed in the autoclave, the side wall panels are cured and cross-linked to the side wall of the tire carcass in the same manner as the tire tread.

FIG. 1 shows a cross-sectional view of a prior art precured tread 10 before it is secured to a tire carcass (not shown) in a precure retread process. The tread 10 includes a top surface 12 through which a tire tread pattern 14 has been formed by a precure molding process. The tire tread 10 also includes a bottom surface 16 that will be positioned in contact with a rubber bonding layer that has been applied to the tire carcass when the tread 10 is to be secured to the tire carcass, as discussed above. The tire tread 10 also includes shoulders 18 and 20 that are angled towards each other from the bottom surface 16 to the top surface 12 as shown. After the tread 10 is molded and cured, excess flash rubber is trimmed along the bottom edges of the shoulders 18 and 20 of the tread 10 forming ridges 22 and 24, respectively. When the tire tread 10 is attached to the tire carcass, the shoulders 18 and 20 continue into the side walls of the tire carcass.

Because the tire retread is precured prior to being attached to the tire carcass, there generally exists a noticeable transition point where the tread shoulders meet the side wall of the tire carcass. In other words, there is a lack of continuation between the tire side wall and the tread shoulder that leaves a band appearance. Additionally, because of the significant transition between the tire carcass side wall and the tire tread, there also exists an inherent weakness for separation of the tread from the tire during use of the retreaded tire, thus generating at least somewhat of a safety concern.

In order to alleviate the above concerns, it has heretofore been known in the art to provide winged portions that extend from the bottom edges of the shoulders of a precure tire tread in order to increase the bonding ability of the tread to the tire carcass, as well as reduce the transition of the tread to the sidewalls of the tire carcass. FIG. 2 shows a cross-sectional view of a prior art winged tread 30. The winged tread 30 also includes a top surface 32 having a tread pattern 34 opposite to a bottom surface 36 that will be formed to a tire carcass in the manner as discussed above. The winged tread 30 also includes angled shoulders 38 and 40. Wing portions 42 and 44 extend from the bottom edges of the shoulders 38 and 40, respectively, so as to cause an extension of the bottom surface 36 of the tread 30, as shown; When the tread 30 is wrapped around the tire carcass, the wing portions 42 and 44 will extend partially down the side walls of the tire carcass, and thus lessen the noticeable transition between the tread 30 and the tire carcass sidewalls when the tread 30 and the tire carcass are bonded together.

Another prior art precure tire tread having wing portions is shown by a cross-sectional view in FIG. 3. This figure shows a gold wing tread 50 that includes a top surface 52 having a tread pattern 54, and a bottom surface 56 to be formed to a tire carcass. The tread 50 also includes wing portions 58 and 60 that extend from angled shoulders 62 and 64, respectively, of the gold wing tread 50. The wing portions 58 and 60 of the tread 50 offer a different type of continuity from the tread 50 to the tire carcass side wall than the tread 30 above.

Although the treads 30 and 50 have been successful in reducing the transition between the side wall of the tire carcass and the tread in the precure process, as well as increasing the ability of the tread to be better secured to the tire carcass, there still remains improvement in this area. Consequently, it is is an object of the present invention to provide a precure tire tread and method of applying the tire tread to a tire carcass in which winged portions extending from the sides of the tread lessen the transition between the retread and the side walls of the tire carcass.

SUMMARY OF THE INVENTION

In accordance with the teaching of the present invention, a precure tire tread and method of applying the tread to a tire carcass is disclosed. To form the precure tire tread, retread tire rubber is placed into a mold cavity of a precure tread mold. The cavity includes an area that will form wing portions extending from the bottom edges of shoulders of the molded tread. The tread mold is then pressurized and heated so as to cure the retread rubber and form the tread. The area of the cavity of the mold that forms the wing portions is kept relatively cool when the mold is heated such that the wing portions remain uncured after the molding step. Consequently, after the molding step that forms the tire tread, the winged portions of the tread are not cured, but the tread portion of the tread is cured.

A rubber bonding layer is applied to the tire carcass, and the tread is then wrapped around the tire carcass over the bonding layer. The carcass is placed within a curing envelope so that the tread is firmly held against the tire carcass to form a tire assembly. The tire assembly is then pressurized and heated in an autoclave such that the bonding layer cross-links the tread rubber with the tire carcass rubber. During the heating step of the tire assembly, the winged portions of the tread are cured and cross-linked to the side walls of the tire carcass. Therefore, the continuation of the side wall into the tread has no transitions.

The mold that forms the tire tread also includes insulated regions around the area of the mold cavity that forms the ends of the tread such that end sections of the tire tread are also left uncured after the tread is molded. When the tread is wrapped around the tire carcass, the uncured ends of the tread contact each other. A mold segment having a tread pattern compatible with the tread pattern of the tread is inserted within the tread pattern of the tread of the uncured end sections of the tread so that the tread pattern of the uncured end sections are not damaged when the tire assembly is processed in the autoclave. After the tire assembly is heated in the autoclave, the uncured end sections of the tread will be cured and cross-linked to each other leaving no tread discontinuity where the ends of the tread meet.

Additional objects, advantages and features of the present invention will become apparent from the following description and appended claims, taken in conjunction with the accompanying drawings.

BRIEF DESCRIPTION OF THE DRAWINGS

FIG. 5 is a cross-sectional view of the precure tire tread of FIG. 4 along line 5—5;

FIG. 6 is a cross-sectional view along the width of a tire tread mold that will form the tire tread of FIGS. 4 and 5;

FIG. 7 is a broken-away cross-sectional view along the length of the tire tread mold of FIG. 6;

DETAILED DESCRIPTION OF THE PREFERRED EMBODIMENTS

The following discussion of the preferred embodiments concerning a tire tread applicable to retread a worn tire carcass is merely exemplary in nature and is in no way intended to limit the invention or its applications or uses.

Figure 1:
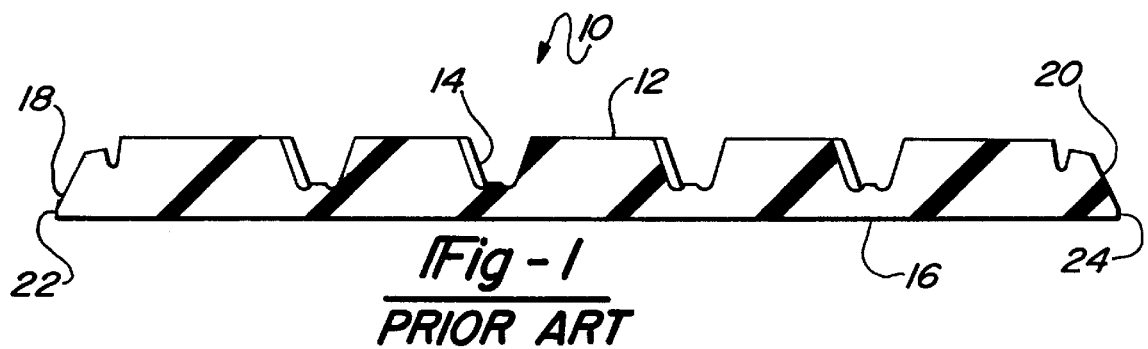
FIG. 1 is a cross-sectional view of a prior art precure tire tread.
Figure 2:
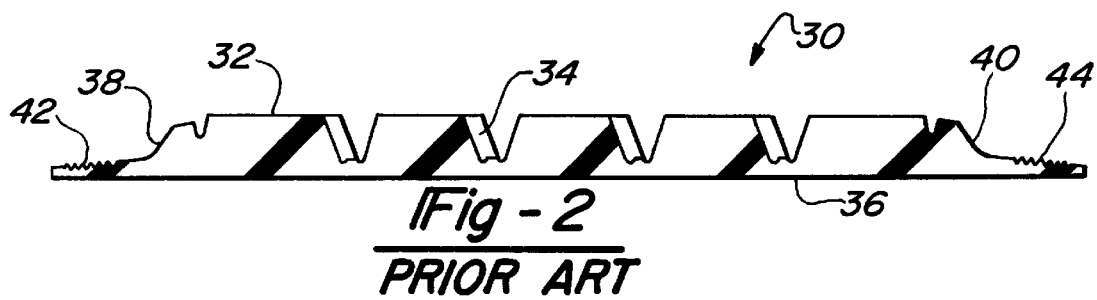
FIG. 2 is a cross-sectional view of a prior art precure tire tread having wing portions.
Figure 3:
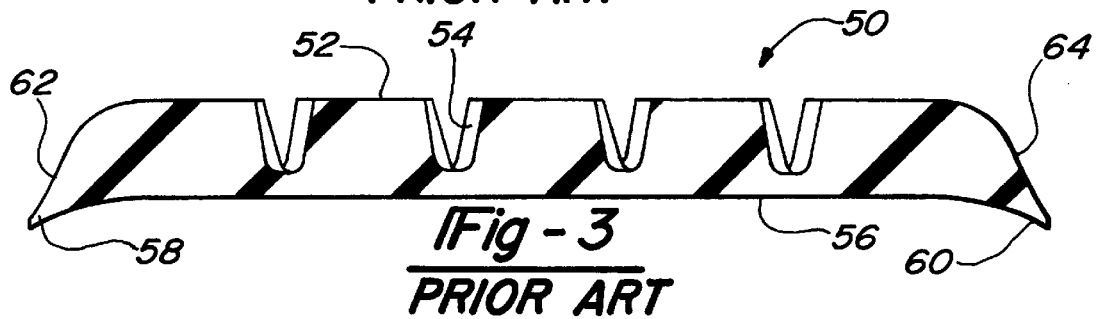
FIG. 3 is a cross-sectional view of another prior art precure tire tread having wing portions.
Figure 4:
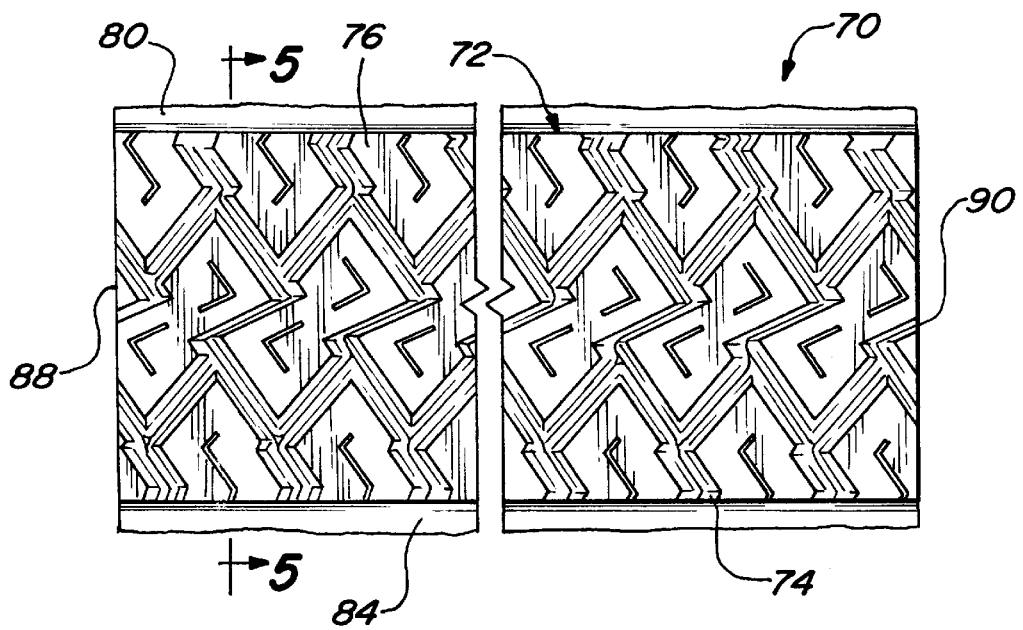
FIG. 4 is a top view of a precured tire tread according to a preferred embodiment of the present invention.

FIG. 4 shows a top view of a tire tread 70 that has been molded and cured, and is ready to be applied to a tire carcass (not shown in FIG. 4), according to a preferred embodiment of the present invention. FIG. 5 is a cross sectional view of the tread 70 along line 5—5 of FIG. 4. The tread 70 can be made of any applicable natural or synthetic rubber for use as a tire tread, as is well understood in the art. The tread 70 includes a cured tread portion 72 having a tread pattern 74 formed through a top surface 76 of the tread portion 72 in accordance with a particular tire use. The tread portion 72 also includes a bottom surface 78 that will be formed to the tire carcass to form a retreaded tire, as will be discussed below.

The tread 70 also includes a first uncured green wing portion 80 extending from a bottom edge of an angled shoulder 82 of the tread portion 72, and a second uncured green wing portion 84 extending from the bottom edge of an angled shoulder 86 of the tread portion 72 such that the wing portions 80 and 84 extend the bottom surface 78. As is apparent, the green wing portions 80 and 84 are much thinner than the thickness of the tread portion 72. Additionally, a first end section 88 and a second end section 90 of the tread portion 72 are also uncured such that when the tread 70 is wrapped around the tire carcass, the uncured end sections 88 and 90 are joined together, as will be discussed below. Alternately, the tread 70 could include a single uncured green wing portion, and only one end section being uncured.

FIG. 6 shows a cross-sectional view through the width of a tire tread mold 100 that is applicable to generate the tire tread 70 shown in FIGS. 4 and 5. The tire tread mold 100 includes an upper platen 102 and a lower platen 104. The tire tread mold 100 is shown in FIG. 6 in an open position such that the upper platen 102 and the lower platen 104 are not in contact with each other. Uncured tire rubber is placed within the mold 100, and either or both of the platens 102 and 104 will be moved by an appropriate mechanism (not shown) such that an inside surface 106 of the upper platen 102 contacts an inside surface 108 of the lower platen 104. Alternately, the uncured tire rubber can be injected into the mold 100 by a suitable injection process. The upper and lower platens 102 and 104 are formed of a highly heat conductive material, such as aluminum, so that when the upper platen 102 and the lower platen 104 are heated by an applicable heating mechanism (not shown), the heat is transferred to the tire rubber in order to mold and cure the rubber into a tire tread, as is well understood in the art.

When the upper platen 102 and the lower platen 104 are in contact with each other, a mold cavity 110 is formed therebetween. The tire tread rubber is placed within the mold cavity 110 to be formed into the tread 70. The mold cavity 110 is defined, at least partially, by a mold cavity insert 112. The mold cavity insert 112 is seated on a base plate 114 positioned within the lower platen 104. The mold cavity insert 112 is removable from the base plate 114 such that other mold cavity inserts can be provided that define other mold cavity shapes. The mold insert 112 is patterned into a desirable shape so as to define the tread pattern 72. The mold cavity 110 includes a first side mold cavity portion 118 and a second side mold cavity portion 120 that form the wing portions 80 and 84 of the tread 70. At the ends of the cavity portions 118 and 120 opposite to the mold cavity insert 112, a cavity flash region 122 is in connection with the cavity portion 118 and a cavity flash portion 124 is in connection with the cavity portion 120. Excess rubber which escapes from the mold cavity 110 during the formation of the tire tread 70 flows into the flash portions 122 and 124, and can later be trimmed away when the tire tread 70 has cooled. Because the flash rubber is not cured, it can be reused for another tread.

In order to prevent the tread rubber within the cavity portions 118 and 120 from being cured while the remaining tread rubber within the cavity 110 is being cured, a series of insulating members 126 define cool zones 128 within the platens 102 and 104 that surround the cavity portions 118 and 120. The insulating members 126 can be any material, such as ceramic, that does not effectively conduct heat and is applicable for the heat and pressure environment for molding rubber. The cool zones 128 prevent most of the heat that is applied to the platens 102 and 204 from reaching the rubber within the cavities 118 and 120, and thus from being cured. The insulating members 126 offer one way of generating the cool zones 128. Other methods of providing cool zones, such as by water cooling, may be applicable as would be understood by one skilled in the art.

FIG. 7 shows a broken-away, cross-sectional view through the length of the mold 100 of FIG. 6. In this view, only one end of the mold 100 is shown. It will be understood that the other end of the mold 100 will be of the same configuration as the shown end, and thus it need not be detailed. It will also be understood that the length of the mold 100 is dependent on the type and size of the tire carcass being retreaded. In other words, the precured tire tread needs to be the appropriate length so as to be securely wrapped around the tire carcass such that the two ends of the tread 70 contact each other in an acceptable manner.

As stated above, the end sections 88 and 90 of the tread portion 72 are left uncured after the curing process. In order to form the uncured end sections 88 and 90, cool zones 130 are provided within the platens 102 and 104 at the ends of the mold 100, as shown, in the same manner as the cool zones 128 are provided. The cool zones 130 are defined by insulating members 132 that do not conduct heat so as to separate the cool zones 130 from the heat being applied to the upper and lower platens 102 and 104. Therefore, after the mold 100 has been heated to cure the tire rubber within the mold cavity 110, uncured winged portions 80 and 84 and uncured end sections 88 and 90 remain. It is noted that the uncured end sections 88 and 90 of the tread portion 72 include the tread pattern 74. Also, flash regions 136 are provided at the ends of the molded cavity 110 in order to catch excess rubber that will later be trimmed away, as discussed above.

The mold 100 is specific for one particular size tire tread. However, it may be desirable to provide a tire tread that has uncured wing portions that are of a different width than the wing portions that are formed by the wing cavity portions 118 and 120. For example, it may be desirable to provide wing portions that extend down the entire length of the side walls of the tire carcass, thus providing replacement rubber for the side walls of the tire carcass. U.S. Pat. No. 4,869,759, discussed above, discloses separate rubber panels for such a purpose. Further, it may be advantageous to change the width of the uncured portion at the ends of the tire tread. It is completely within the intent and scope of this invention that different tire tread molds can be provided to alter these and other dimension of the precured tire tread.

Figure 8:
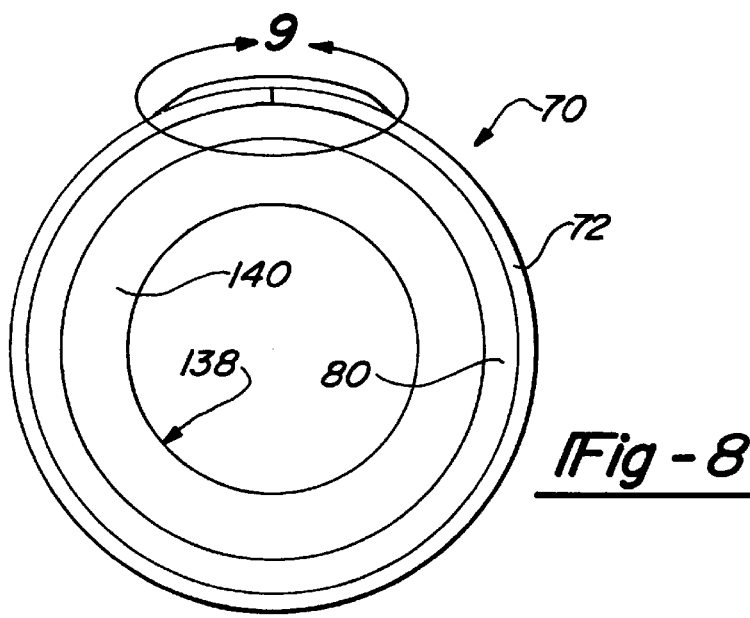
FIG. 8 is a side view of a tire carcass including the tire tread of FIGS. 4 and 5.
Figure 9:
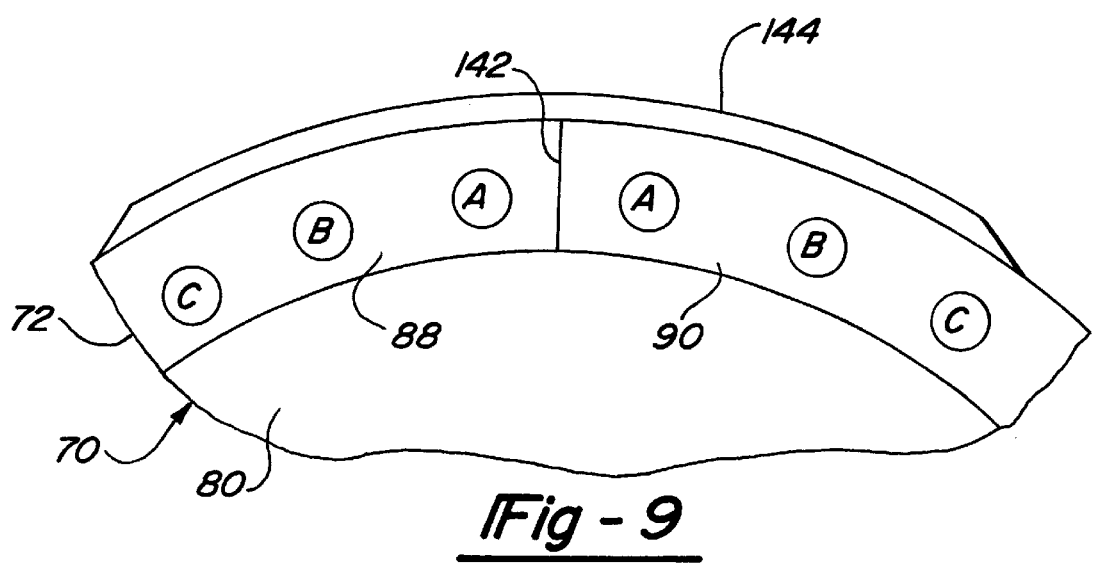
FIG. 9 is a blown-up view of a section of FIG. 8 showing the joint of the ends of the tire tread of FIGS. 4 and 5.

FIGS. 8 and 9 show the tire tread 70 wrapped around a tire carcass 138 prior to the tire carcass 138 and retread 70 being placed in an autoclave (not shown) that will cross-link the tire tread 70 to the tire carcass 138. Note that the wing portion 80 extends a certain distance down a side wall 140 of the tire carcass 138. Once the tire tread 70 is wrapped around the tire carcass 138, the tire carcass 138 is placed in an envelope (not shown) in order to secure the tire tread 70 to the tire carcass 138 before it is placed in the autoclave. Although the envelope is not shown, such a process is specifically set out in U.S. Pat. No. 4,624,732 mentioned above. FIG. 9 shows a butt joint 142 where the end sections 88 and 90 of the tread 70 meet. Areas of the end sections 88 and 90 are labeled A, B and C depending on the degree that these areas are cured after the tire tread molding process. The area A represents an uncured area that is formed within the cool zone 130 of the mold 100. The area B represents an area having varying degrees of cured rubber depending on how much heat the area B receives during the molding process. In other words, depending how far the area B is away from the cool zone 130, the distance from the top surface 76 or the bottom surface 78 of the tread portion 72, etc., will determine to what degree the rubber in this area has been cured. The area C represents the areas adjacent the end sections 88 and 90 that have been fully, or nearly fully, cured during the molding process. As is apparent from this depiction, uncured rubber portions contact each other at the butt joint 142.

Figure 10:
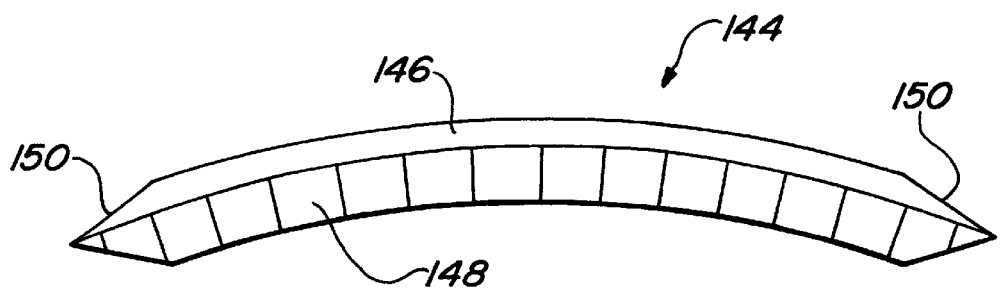
FIG. 10 is a side view of a mold segment placed within the tread pattern of the tire tread as shown in FIG. 9.

Because the end sections 88 and 90 are uncured after the molding process, the tread pattern 74 within the end sections 88 and 90 formed by the mold insert 112 may be damaged during the heating process in the autoclave that cross-links the tread 70 to the tire carcass 138. In order to prevent damage to the tread pattern 74 within the end sections 88 and 90 during the autoclaving process, a mold segment 144 is provided. FIG. 10 shows a side view of the mold segment 144 before it is inserted in the tread 70 at the end sections 88 and 90 as shown in FIGS. 8 and 9. The mold segment 144 includes a top plate 146 and a series of ribs 148 extending down from the top plate 146. The ribs 148 are patterned in the same manner as the tread pattern 72 of the tread 70. Additionally, the mold segment 144 is curved to fit the radius of the tire carcass 138. The mold segment 144 includes tapered ends 150 in order to provide a lessened transition between the top surface 76 of the tire tread 70 and the mold segment 144. The mold segment 144 is made of a heat conductive material such as aluminum.

The mold segment 144 is placed within the tire tread 70 after the tire tread 70 is wrapped around the tire carcass 138, but prior to the tire carcass 138 and tread 70 being placed in the autoclave envelope. The ribs 148 extend into the tread pattern 72 of the tread 70, and the top plate 146 rides against the top surface 76 of the tread 70. Therefore, when the uncured end sections 88 and 90 of the tread 70 are cured in the autoclave, the mold segment 144 prevents distortion of the tread pattern 72 in this area. The heat and pressure from the autoclaving process cross-links the end section 88 to the end section 90 such that the butt joint 142 is eliminated.

The foregoing discussion discloses and describes merely exemplary embodiments of the present invention. One skilled in the art would readily recognize from such discussion, and from the accompanying drawings and claims, that various changes, modifications and variations can be made therein without departing from the spirit and scope of the invention as defined in the following claims.

What is claimed is:

1. A method of securing a tire tread to a worn tire carcass, said method comprising the steps of:

providing a precured tire tread, said precured tire tread including a cured tire tread portion having a tire tread pattern and uncured wing portions extending from first and second shoulders of the cured tire tread portion;

wrapping the tire tread around the worn tire carcass such that first and second ends of the tire tread portion abut against each other and the uncured wing portions extend along opposing sidewalls of the tire carcass; and placing the tire carcass and attached tire tread within an autoclave so as to cure and cross-link the wing portions to the sidewalls of the tire carcass to reduce the transition between the tire tread and the tire carcass.

2. The method according to claim 1 wherein the step of providing a precured tire tread includes providing a precured tire tread that has first and second uncured end sections.

3. The method according to claim 2 further comprising the steps of providing a mold segment having a top plate and a series of ribs extending from the top plate, wherein the ribs are shaped to conform with the shape of the tire tread pattern, and inserting the mold segment into the tread pattern of the tire tread portion where the first and second end sections are joined, wherein the step of placing the tire carcass and the attached tire tread within an autoclave includes cross-linking the first and second end sections together so as to eliminate the joint between the first and second end sections.

4. The method according to claim 4 wherein the step of providing a mold segment includes providing a mold segment that has tapered ends and is curved to conform with the radius of the tire carcass.

5. A method of securing a tire tread to a worn tire carcass, said method comprising the steps of:

providing a precure tire tread, said precure tire tread including a tire tread portion having a tread pattern and having a first end section and a second end section, wherein the first and second end sections are uncured and the remaining part of the tire tread portion is cured;

wrapping the tire tread around the worn tire carcass such that the first and second end sections abut against each other;

providing a mold segment having a top plate and a series of ribs extending therefrom, wherein the ribs are shaped to conform with the shape of the tire tread pattern;

inserting the mold segment into the tread pattern of the tire tread portion at the joining area between the first and second end sections; and placing the tire carcass and attached tire tread within an autoclave so as to cure and cross-link the first and second end sections together.

6. The method according to claim 5 wherein the step of providing a mold segment includes providing a mold segment that has tapered ends and is curved to conform with the radius of the tire carcass.

* * * * *